(12) United States Patent
Oshima et al.

(10) Patent No.: US 9,850,367 B2
(45) Date of Patent: Dec. 26, 2017

(54) POLYACETAL RESIN COMPOSITION AND RESIN MOLDED ARTICLE

(71) Applicant: MITSUBISHI ENGINEERING-PLASTICS CORPORATION, Tokyo (JP)

(72) Inventors: Makiko Oshima, Kanagawa (JP); Kunihiko Fujimoto, Kanagawa (JP); Masayuki Nagai, Kanagawa (JP); Hidetoshi Nawata, Tokyo (JP); Koki Sato, Niigata (JP); Ryusuke Tamaki, Tokyo (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 0 days.

(21) Appl. No.: 15/112,450

(22) PCT Filed: Jan. 27, 2015

(86) PCT No.: PCT/JP2015/052092
§ 371 (c)(1),
(2) Date: Jul. 19, 2016

(87) PCT Pub. No.: WO2015/115386
PCT Pub. Date: Aug. 6, 2015

(65) Prior Publication Data
US 2016/0333170 A1 Nov. 17, 2016

(30) Foreign Application Priority Data
Jan. 28, 2014 (JP) .................. 2014-012893

(51) Int. Cl.
*C08K 5/30* (2006.01)
*C08K 5/25* (2006.01)

(52) U.S. Cl.
CPC . *C08K 5/30* (2013.01); *C08K 5/25* (2013.01)

(58) Field of Classification Search
CPC .................................... C08K 5/30; C08K 5/25
See application file for complete search history.

(56) References Cited

U.S. PATENT DOCUMENTS

2013/0289165 A1 10/2013 De Landtsheer et al.

FOREIGN PATENT DOCUMENTS

| | | |
|---|---|---|
| EP | 1 683 838 A1 | 7/2006 |
| JP | 2005-137785 A | 6/2005 |
| JP | 2005-325225 A | 11/2005 |
| JP | 2005-336304 A | 12/2005 |
| JP | 2007-070574 A | 3/2007 |
| JP | 2009-084369 A | 4/2009 |
| JP | 2011-219594 A | 11/2011 |
| JP | 2014-501827 A | 1/2014 |

OTHER PUBLICATIONS

International Search Report for PCT/JP2015/052092 dated Mar. 24, 2015 [PCT/ISA/210].
Written Opinion for PCT/JP2015/052092 dated Mar. 24, 2015 [PCT/ISA/237].
Communication dated Aug. 9, 2017 from the European Patent Office in application No. 15743411.9.

*Primary Examiner* — John Uselding
(74) *Attorney, Agent, or Firm* — Sughrue Mion, PLLC

(57) ABSTRACT

Provided is a polyacetal resin composition in which at least one dihydrazone compound (B) selected from the group of two kinds of dihydrazone compounds is blended in 0.02 to 5 parts by mass with respect to 100 parts by mass of a polyacetal resin (A).

20 Claims, No Drawings

POLYACETAL RESIN COMPOSITION AND RESIN MOLDED ARTICLE

CROSS REFERENCE TO RELATED APPLICATIONS

This application is a National Stage of International Application No. PCT/JP2015/052092 filed Jan. 27, 2015, claiming priority based on Japanese Patent Application No. 2014-012893 filed Jan. 28, 2014, the contents of all of which are incorporated herein by reference in their entirety.

TECHNICAL FIELD

The present invention relates to a polyacetal resin composition and a resin molded article.

BACKGROUND ART

Polyacetal resins, which are engineering plastics, have excellent mechanical property, sliding property, frictional and wearing properties, heat resistance, molding processability, and the like. For this reason, polyacetal resin compositions containing polyacetal resins have been widely used for, for example, various machine components or electrical components of automobiles, OA instruments, and the like.

However, since formaldehyde is used as a main raw material of the polyacetal resin, the polyacetal resin is slightly thermally decomposed by thermal history in molding processing and the like. Thus, although in a very minute amount, formaldehyde is generated. Herein, since there is a possibility that sick house syndrome or the like may occur due to formaldehyde, there is a demand for a polyacetal resin composition in which generation of formaldehyde is sufficiently suppressed.

As such a polyacetal resin composition, a polyacetal resin composition disclosed in Patent Document 1 described below is known. Patent Document 1 described below discloses a polyacetal resin composition obtained by blending a dihydrazone compound with a polyacetal resin at a predetermined ratio, and proposes that with use of this polyacetal resin composition, the generated amount of formaldehyde generated from a product is reduced and contamination of a mold at the time of molding process is also suppressed.

CITATION LIST

Patent Document

Patent Document 1: JP 2007-70574 A

SUMMARY OF THE INVENTION

Problem to be Solved by the Invention

However, in the polyacetal resin composition described in Patent Document 1 described above, in some cases, it is not possible to sufficiently suppress generation of formaldehyde. In addition, in the polyacetal resin composition described in Patent Document 1 described above, in some cases, it is not possible to provide excellent mechanical property to a molded article obtainable by molding the polyacetal resin composition.

The invention has been made in view of the aforementioned circumstance, and an object thereof is to provide a polyacetal resin composition capable of sufficiently suppressing generation of formaldehyde, sufficiently suppressing contamination of the mold at the time of molding process, and providing excellent mechanical property to a molded article and to provide a resin molded article.

Means for Solving Problem

The present inventors conducted intensive investigation to solve the above-described problems. As a result, the present inventors considered that when a terminal group of a dihydrazone compound is set to a specific group which is less likely to cause steric hindrance, the reactivity between the dihydrazone compound and formaldehyde is especially increased, and thus generation of formaldehyde can be sufficiently suppressed. In addition, the present inventors considered that a product material obtainable at this time is less likely to be bled out from the polyacetal resin composition, or even when the product material is bled out, it is less likely to adhere to a mold, and thus contamination of the mold at the time of molding process can be also sufficiently suppressed. Moreover, the present inventors considered that when the dihydrazone compound is excessively blended with respect to the polyacetal resin, mechanical property of a molded article may be deteriorated. Therefore, the present inventors found that the above-described problems can be solved by the following inventions.

That is, the invention is a polyacetal resin composition in which at least one dihydrazone compound (B) selected from the group selected from a dihydrazone compound (B1) represented by the following General Formula (1) and a dihydrazone compound (B2) represented by the following General Formula (2) is blended in 0.02 to 5 parts by mass with respect to 100 parts by mass of a polyacetal resin (A).

[Chem. 1]

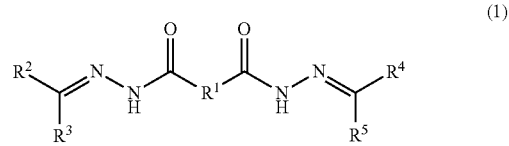

(1)

(In the above formula, $R^1$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms; $R^2$ to $R^5$ each independently represent a hydrogen atom or an alkyl group having 1 or 2 carbon atoms; at least one of $R^2$ and $R^3$ represents an alkyl group having 1 or 2 carbon atoms; and at least one of $R^4$ and $R^5$ represents an alkyl group having 1 or 2 carbon atoms)

[Chem. 2]

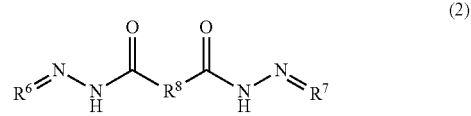

(2)

(In the above formula, $R^8$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms;

and $R^6$ and $R^7$ each independently represent an alicyclic hydrocarbon group having 3 to 12 carbon atoms.)

According to the polyacetal resin composition of the invention, generation of formaldehyde can be effectively suppressed, contamination of the mold at the time of molding process can be sufficiently suppressed, and excellent mechanical property can be provided to a molded article.

In the polyacetal resin composition, it is preferable that in the above General Formula (1), $R^1$ be an aliphatic hydrocarbon group having 6 to 12 carbon atoms.

In this case, the reactivity between the dihydrazone compound (B) and formaldehyde is further increased, and thus generation of formaldehyde is more effectively suppressed. Further, contamination of the mold at the time of molding process can be more sufficiently suppressed.

In the polyacetal resin composition, it is preferable that in the above General Formula (1), when $R^2$ and $R^4$ are an ethyl group, $R^3$ and $R^5$ be a hydrogen atom, and when $R^2$ and $R^4$ are a methyl group, $R^3$ and $R^5$ be a hydrogen atom or a methyl group.

In this case, the reactivity between the dihydrazone compound (B) and formaldehyde is further increased, and thus generation of formaldehyde is more effectively suppressed. Further, contamination of the mold at the time of molding process can be more sufficiently suppressed.

In the polyacetal resin composition, it is preferable that the dihydrazone compound (B) be blended in 0.05 to 3 parts by mass with respect to 100 parts by mass of the polyacetal resin (A).

In this case, as compared with a case where the blended amount of the dihydrazone compound (B) is less than 0.05 part by mass, generation of formaldehyde can be more sufficiently suppressed. In addition, as compared with a case where the blended amount of the dihydrazone compound (B) is more than 3 parts by mass, more excellent mechanical property can be provided to a molded article obtainable by molding the polyacetal resin composition.

In the polyacetal resin composition, it is preferable that a hydrazide compound (C) be further blended at a ratio of 0.01 to 1 part by mass with respect to 100 parts by mass of the polyacetal resin (A).

In this case, as compared with a case where the blended amount of the hydrazide compound (C) is less than 0.01 part by mass with respect to 100 parts by mass of the polyacetal resin (A), generation of formaldehyde can be more sufficiently suppressed. In addition, as a compared with a case where the blended amount of the hydrazide compound (C) is more than 1 part by mass with respect to 100 parts by mass of the polyacetal resin (A), contamination of the mold at the time of molding process can be sufficiently suppressed and more excellent mechanical property can be provided to a molded article obtainable by molding the polyacetal resin composition.

It is preferable that the hydrazide compound (C) be composed of at least one kind of the group consisting of a monohydrazide compound and a dihydrazide compound.

In this case, as compared with a case where the hydrazide compound (C) is composed of a hydrazide compound having three or more hydrazide groups in the molecule, the hydrazide group can be efficiently dispersed in the polyacetal resin and the added amount of the hydrazide compound (C) can be more sufficiently suppressed.

It is particularly preferable that the hydrazide compound (C) be composed of a dihydrazide compound.

In this case, as compared with a case where the hydrazide compound is composed of only a monohydrazide compound or a case where the hydrazide compound is composed of a monohydrazide compound and a dihydrazide compound, generation of formaldehyde can be more sufficiently suppressed.

In addition, the invention is a resin molded article being obtained by molding the polyacetal resin composition.

According to this resin molded article, generation of formaldehyde can be sufficiently suppressed, and excellent mechanical property can be achieved.

Effect of the Invention

According to the invention, it is possible to provide a polyacetal resin composition capable of sufficiently suppressing generation of formaldehyde, sufficiently suppressing contamination of the mold at the time of molding process, and providing excellent mechanical property to a molded article and to provide a resin molded article.

MODE(S) FOR CARRYING OUT THE INVENTION

Hereinafter, the invention will be described in detail.

The invention is a polyacetal resin composition in which at least one dihydrazone compound (B) selected from the group selected from a dihydrazone compound (B1) represented by the following General Formula (1) and a dihydrazone compound (B2) represented by the following General Formula (2) is blended in 0.02 to 5 parts by mass with respect to 100 parts by mass of a polyacetal resin (A).

[Chem. 3]

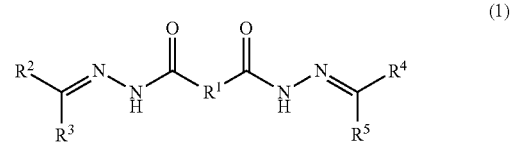

(1)

(In the above formula, $R^1$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms; $R^2$ to $R^5$ each independently represent a hydrogen atom or an alkyl group having 1 or 2 carbon atoms; at least one of $R^2$ and $R^3$ represents an alkyl group having 1 or 2 carbon atoms; and at least one of $R^4$ and $R^5$ represents an alkyl group having 1 or 2 carbon atoms)

[Chem. 4]

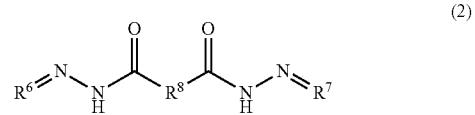

(2)

(In the above formula, $R^8$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms; and $R^6$ and $R^7$ each independently represent an alicyclic hydrocarbon group having 3 to 12 carbon atoms.)

According to this polyacetal resin composition, generation of formaldehyde can be sufficiently suppressed, contamination of the mold at the time of molding process can be sufficiently suppressed, and excellent mechanical property can be provided to a molded article.

Hereinafter, the polyacetal resin (A) and the dihydrazone compound (B) used in the polyacetal resin composition of the invention will be described in detail.

(A) Polyacetal Resin

The polyacetal resin is not particularly limited, and may be a homopolymer including only a divalent oxymethylene group as a constitutional unit or a copolymer including a divalent oxymethylene group and a divalent oxyalkylene group having 2 or more carbon atoms as constitutional units.

Examples of the oxyalkylene group having 2 or more carbon atoms include an oxyethylene group, an oxypropylene group, and an oxybutylene group.

In the polyacetal resin, the ratio of the oxyalkylene group having 2 or more carbon atoms to the total mole number of the oxymethylene group and the oxyalkylene group having 2 or more carbon atoms is not particularly limited, and for example, may be 0.5 to 10 mol %. The number of carbon atoms in the oxyalkylene group may be 2 or more, but is preferably 6 or less and more preferably 4 or less.

In order to produce the above-described polyacetal resin, generally, trioxane is used as a main raw material. Further, in order to introduce an oxyalkylene group having 2 to 6 carbon atoms into the polyacetal resin, for example, cyclic formal or cyclic ether can be used. Specific examples of the cyclic formal include 1,3-dioxolan, 1,3-dioxane, 1,3-dioxepane, 1,3-dioxocane, 1,3,5-trioxepane, and 1,3,6-trioxocane. Specific examples of the cyclic ether include ethylene oxide, propylene oxide, and butylene oxide. In order to introduce an oxyethylene group into the polyacetal resin (A), for example, 1,3-dioxolan may be used, in order to introduce an oxypropylene group into the polyacetal resin (A), 1,3-dioxane may be used, and in order to introduce an oxybutylene group into the polyacetal resin (A), 1,3-dioxepane may be introduced.

Incidentally, it is desirable that the polyacetal resin contain a small amount of each of a hemiformal terminal group, a formyl terminal group, and a terminal group that is unstable with respect to heat, acid, and a basic group. Herein, the hemiformal terminal group is represented by —OCH$_2$OH, and the formyl terminal group is represented by —CHO.

(B) Dihydrazone Compound

The dihydrazone compound (B) blended in the polyacetal resin composition of the invention is at least one of a dihydrazone compound (B1) represented by the above General Formula (1) and a dihydrazone compound (B2) represented by the above General Formula (2).

In General Formula (1), $R^1$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms.

The aliphatic hydrocarbon group may be saturated or unsaturated, or may be linear or branched.

Specific examples of the aliphatic hydrocarbon group include alkylene groups such as a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, and an icosylene group.

The aliphatic hydrocarbon group is preferably an aliphatic hydrocarbon group having 6 to 12 carbon atoms. In this case, the reactivity between the dihydrazone compound (B) and formaldehyde is further increased, and thus generation of formaldehyde is more effectively suppressed. In addition, contamination of the mold at the time of molding process can be more sufficiently suppressed.

The alicyclic hydrocarbon group may be saturated or unsaturated.

Examples of the alicyclic hydrocarbon group include a cycloalkylene group having 6 to 10 carbon atoms. Examples of the cycloalkylene group include a cyclohexylene group.

Examples of the aromatic hydrocarbon group include arylene groups such as a phenylene group and a naphthylene group.

A substituent may be bonded to at least a part of carbon atoms of the aromatic hydrocarbon group. Examples of this substituent include a halogen group, a nitro group, and an alkyl group having 1 to 20 carbon atoms.

In General Formula (1), $R^2$ to $R^5$ each independently represent a hydrogen atom or an alkyl group having 1 or 2 carbon atoms, at least one of $R^2$ and $R^3$ represents an alkyl group having 1 or 2 carbon atoms, and at least one of $R^4$ and $R^5$ represents an alkyl group having 1 or 2 carbon atoms.

Herein, in General Formula (1), when $R^2$ and $R^4$ are an ethyl group, $R^3$ and $R^5$ are a hydrogen atom, and when $R^2$ and $R^4$ are a methyl group, $R^3$ and $R^5$ are preferably a hydrogen atom or a methyl group.

In this case, the reactivity between the dihydrazone compound (B) and formaldehyde is further increased, and thus generation of formaldehyde is more effectively suppressed. In addition, contamination of the mold at the time of molding process can be more sufficiently suppressed.

Examples of the alkyl group having 1 or 2 carbon atoms include a methyl group and an ethyl group.

Specific examples of the dihydrazone compound (B1) represented by the above General Formula (1) include 1,12-bis[2-(1-methylethylidene)hydrazino]]-1,12-dodecanedione, 1,12-bis(2-ethylidenehydrazino)-1,12-dodecanedione, 1,12-bis(2-propylidenehydrazino)-1,12-dodecanedione, 1,12-bis[2-(1-methylpropylidene)hydrazino]-1,12-dodecanedione, 1,12-bis[2-(1-ethylpropylidene)hydrazino]-1,12-dodecanedione, 1,10-bis[2-(1-methylethylidene)hydrazino]]-1,10-decanedione, 1,10-bis(2-propylidenehydrazino)-1,10-decanedione, 1,10-bis(2-propylidenehydrazino)-1,10-decanedione, 1,10-bis[2-(1-methylpropylidene)hydrazino]-1,10-decanedione, 1,10-bis[2-(1-ethylpropylidene)hydrazino]-1,10-decanedione, 1,6-bis[2-(1-methylethylidene)hydrazino]-1,6-hexanedione, 1,6-bis(2-ethylidenehydrazino)-1,6-hexanedione, 1,6-bis(2-propylidenehydrazino)-1,6-hexanedione, 1,6-bis[2-(1-methylpropylidene)hydrazino]-1,6-hexanedione, and 1,6-bis[2-(1-ethylpropylidene)hydrazino]-1,6-hexanedione.

The dihydrazone compound (B1) represented by the above General Formula (1) may be blended alone or two or more kinds thereof may be blended in combination.

In General Formula (2), as in $R^1$, $R^8$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms. $R^8$ may be the same as or different from $R^1$ in General Formula (1).

$R^6$ and $R^7$ each independently represent an alicyclic hydrocarbon group having 3 to 12 carbon atoms.

Examples of the alicyclic hydrocarbon group having 3 to 12 carbon atoms include a cyclohexylene group.

Specific examples of the dihydrazone compound (B2) represented by the above General Formula (2) include 1,12-bis(2-cyclohexylidenehydrazino)-1,12-dodecanedione, 1,10-bis(2-cyclohexylidenehydrazino)-1,10-decanedione, and 1,6-bis(2-cyclohexylidenehydrazino)-1,6-hexanedione.

The dihydrazone compound (B2) represented by the above General Formula (2) may be blended alone or two or more kinds thereof may be blended in combination.

The blended amount of the dihydrazone compound (B) is 0.02 part by mass or more with respect to 100 parts by mass of the polyacetal resin. When the blended amount of the dihydrazone compound (B) is less than 0.02 part by mass, generation of formaldehyde cannot be sufficiently suppressed. When the blended amount of the dihydrazone compound (B) is preferably 0.05 part by mass or more, more preferably 0.1 part by mass or more, and particularly preferably 0.3 part by mass or more with respect to 100 parts by mass of the polyacetal resin, from the viewpoint of further suppressing generation of formaldehyde.

Meanwhile, the blended amount of the dihydrazone compound (B) is 5 parts by mass or less with respect to 100 parts by mass of the polyacetal resin. When the blended amount of the dihydrazone compound (B) is more than 5 parts by mass, excellent mechanical property cannot be provided to a molded article. The blended amount of the dihydrazone compound (B) is preferably 3 parts by mass or less with respect to 100 parts by mass of the polyacetal resin, from the viewpoint of further improving mechanical property with respect to a molded article obtainable by molding the polyacetal resin composition. Further, from the viewpoint of further suppressing mold contamination, the blended amount of the dihydrazone compound (B) is preferably 0.5 part by mass or less with respect to 100 parts by mass of the polyacetal resin.

The blended amount of the dihydrazone compound (B) is preferably 0.05 to 3 parts by mass with respect to 100 parts by mass of the polyacetal resin. In this case, as compared with a case where the blended amount of the dihydrazone compound (B) is less than 0.05 part by mass, generation of formaldehyde is more sufficiently suppressed. In addition, as compared with a case where the blended amount of the dihydrazone compound (B) is more than 3 parts by mass, more excellent mechanical property can be provided to a molded article obtainable by molding the polyacetal resin composition.

The blended amount of the dihydrazone compound (B) is more preferably 0.1 to 1.0 part by mass with respect to 100 parts by mass of the polyacetal resin.

Incidentally, the dihydrazone compound (B1) and the dihydrazone compound (B2) can be obtained by reacting a dicarboxylic acid derivative such as dicarboxylic acid halide or dicarboxylic acid ester with hydrazine to generate a dihydrazide compound and reacting the dihydrazide compound with ketone or aldehyde. At this time, $R^1(COX)_2$ or $R^8(COX)_2$ is used as dicarboxylic acid halide and $R^1(COOY)_2$ or $R^8(COOY)_2$ is used as dicarboxylic acid ester. Herein, Y represents an alkyl group. As ketone or aldehyde, $R^2$—C(=O)—$R^3$, $R^4$—C(=O)—$R^5$, $R^6$=O, or $R^7$=O is used.

The polyacetal resin composition of the invention may contain at least one of a hydrazide compound (C), a thermal stabilizer (D), a mold-releasing agent (E), and a weathering stabilizer (F), as necessary. Hereinafter, the hydrazide compound (C), the thermal stabilizer (D), the mold-releasing agent (E), and the weathering stabilizer (F) will be described in detail.

(C) Hydrazide Compound

The hydrazide compound (C) may be a hydrazide compound having at least one hydrazide group in the molecule. Examples of the hydrazide compound (C) include a monohydrazide compound, a dihydrazide compound, and a polyhydrazide compound such as a trihydrazide compound.

Incidentally, in the present specification, a hydrazide compound having three or more hydrazide groups in the molecule is referred to as a polyhydrazide compound.

Any of an aliphatic monohydrazide compound and an aromatic monohydrazide compound can be used as a monohydrazide compound.

Examples of the aliphatic monohydrazide compound include propionic acid hydrazide, thiocarbohydrazide, and stearic acid hydrazide.

Examples of the aromatic monohydrazide compound include salicylic acid hydrazide, 3-hydroxy-2-naphthoic acid hydrazide, p-toluenesulfonyl hydrazide, aminobenzhydrazide, and 4-pyridinecarboxylic acid hydrazide.

In addition, any of an aliphatic monohydrazide compound and an aromatic monohydrazide compound can be used as a dihydrazide compound.

Examples of the aliphatic dihydrazide compound include carbodihydrazide, oxalic acid dihydrazide, malonic acid dihydrazide, succinic acid dihydrazide, glutaric acid dihydrazide, adipic acid dihydrazide, azelaic acid dihydrazide, sebacic acid dihydrazide, dodecanedioic acid dihydrazide (1,12-dodecane dicarbohydrazide), 1,18-octadecane dicarbohydrazide, stearic acid dihydrazide, maleic acid dihydrazide, fumaric acid dihydrazide, and 7,11-octadecadien-1,18-dicarbohydrazide.

Examples of the aromatic dihydrazide compound include isophthalic acid dihydrazide, terephthalic acid dihydrazide, 1,5-naphthalene dicarbohydrazide, 1,8-naphthalene dicarbohydrazide, 2,6-naphthalene dicarbohydrazide, 4,4'-oxybis-benzenesulfonyl hydrazide, and 1,5-diphenyl carbonohydrazide.

Examples of the polyhydrazide compound include aminopolyacrylamide and 1,3,5-tris(2-hydrazinocarbonylethyl) isocyanurate.

The hydrazide compound (C) may be used alone or as a mixture of two or more kinds thereof. In the polyacetal resin composition of the invention, the blended amount of the hydrazide compound (C) is preferably 0.01 to 1 part by mass with respect to 100 parts by mass of the polyacetal resin (A).

In this case, as compared with a case where the blended amount of the hydrazide compound (C) is less than 0.01 part by mass with respect to 100 parts by mass of the polyacetal resin (A), generation of formaldehyde can be more sufficiently suppressed. In addition, as compared with a case where the blended amount of the hydrazide compound (C) is more than 1 part by mass with respect to 100 parts by mass of the polyacetal resin (A), contamination of the mold at the time of molding process can be sufficiently suppressed, and more excellent mechanical property can be provided to a molded article obtainable by molding the polyacetal resin composition.

The hydrazide compound (C) is preferably constituted by at least one from the group consisting of a monohydrazide compound and a dihydrazide compound.

In this case, as compared with a case where the hydrazide compound (C) is constituted by a hydrazide compound having three or more hydrazide groups in the molecule, the hydrazide group can be efficiently dispersed in the polyacetal resin and the added amount of the hydrazide compound (C) can be more sufficiently suppressed.

In particular, the hydrazide compound (C) is preferably constituted by a dihydrazide compound. In this case, as compared with a case where the hydrazide compound is constituted by only a monohydrazide compound or a case where the hydrazide compound is constituted by a monohydrazide compound and a dihydrazide compound, generation of formaldehyde can be more sufficiently suppressed.

The blended amount of the hydrazide compound (C) is preferably 0.3 to 1 part by mass with respect to 100 parts by mass of the polyacetal resin (A). In this case, as compared with a case where the blended amount of the hydrazide compound (C) is less than 0.3 part by mass with respect to 100 parts by mass of the polyacetal resin (A), generation of formaldehyde can be more sufficiently suppressed.

(D) Thermal Stabilizer

The thermal stabilizer is not particularly limited, but a hindered phenol compound or a triazine compound is preferably used as the thermal stabilizer. One kind of these compounds may be blended alone or two or more kinds thereof may be blended in combination. In this case, generation of formaldehyde is further effectively suppressed.

The hindered phenol (sterically hindered phenol) compound indicates a compound having at least one structure that is represented by the following General Formula (3) and has a substituent at an ortho position with respect to a phenolic hydroxyl group, in the molecule.

[Chem. 5]

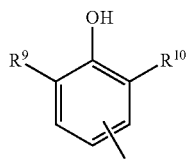

(3)

In General Formula (3), $R^9$ and $R^{10}$ each independently represent a substituted or unsubstituted alkyl group.

Examples of the alkyl group represented by $R^9$ and $R^{10}$ include groups having 1 to 6 carbon atoms such as a methyl group, an ethyl group, a propyl group, a butyl group, and an amyl group. Among these, a bulky branched alkyl group such as a t-butyl group is preferable, and at least one of $R^9$ and $R^{10}$ is preferably such a branched alkyl group. As a substituted alkyl group, those in which a hydrogen atom of an unsubstituted alkyl group is substituted with a halogen atom such as chlorine can be used.

Examples of the hindered phenol compound used in the invention include 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyldimethylamine, distearyl-3,5-di-t-butyl-4-hydroxybenzylphosphonate, diethyl-3,5-di-t-butyl-4-hydroxybenzylphosphonate, 2,6,7-trioxa-1-phospha-bicyclo[2,2,2]-oct-4-yl-methyl-3,5-di-t-butyl-4-hydroxyhydrocinnamate, 3,5-di-t-butyl-4-hydroxyphenyl-3,5-distearyl-thiotriazylamine, 2-(2-hydroxy-3,5-di-t-butylphenyl)-5-chlorobenzotriazol, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocinnamamide), octadecyl-3-(3,5-di-t-butyl-4-hydroxyphenyl)propionate, 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], and 2,2'-thiodiethyl-bis[3-(3,5-di-t-butyl-4-hydroxyphenyl) propionate].

Among these, a compound having a structure represented by the following General Formula (4), such as N,N-hexamethylenebis(3,5-di-t-butyl-4-hydroxy-hydrocinnamamide), is preferable.

[Chem. 6]

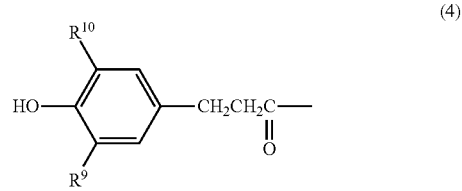

(4)

In General Formula (4), $R^9$ and $R^{10}$ each independently have the same meaning as $R^9$ and $R^{10}$ in General Formula (3).

Further, esters of propionic acid having a 3,5-dialkyl-4-hydroxyphenyl group at the 3-position with polyhydric alcohol are also preferable, including 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], and 2,2'-thiodiethyl-bis[3-(3,5-di-t-butyl-4-hydroxyphenyl) propionate].

The triazine compound is basically an amino-substituted triazine compound having a structure represented by the following General Formula (5) or an initial polycondensate of the amino-substituted triazine compound and formaldehyde.

[Chem. 7]

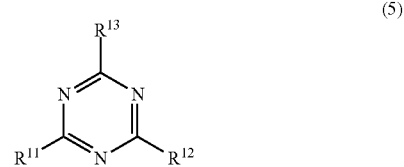

(5)

(In the above General Formula (5), $R^{11}$, $R^{12}$, and $R^{13}$ each independently represent a hydrogen atom, a halogen atom, a hydroxyl group, a mercapto group, an alkyl group, an aralkyl group, an aryl group, a cycloalkyl group, an amino group, or a substituted amino group, and at least one of $R^{11}$, $R^{12}$, and $R^{13}$ represents an amino group or a substituted amino group.)

Specific examples of the amino-substituted triazine compound or an initial polycondensate of the amine-substituted triazine compound and formaldehyde include guanamine, melamine, N-butylmelamine, N-phenylmelamine, N,N-diphenylmelamine, N,N-diallylmelamine, N,N',N"-triphenylmelamine, N,N',N"-trimethylolmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, and ameline(N,N,N',N'-tetracyanoethylbenzoguanamine), and an initial polycondensate of these amino-substituted triazine compounds and formaldehyde. Among these, melamine, methylolmelamine, benzoguanamine, and a water-soluble melamine-formaldehyde resin are particularly preferable.

The blended amount of the thermal stabilizer (D) is preferably 0.01 to 3 parts by mass, more preferably 0.05 to 2 parts by mass, and even more preferably 0.1 to 1 part by mass with respect to 100 parts by mass of the polyacetal resin. When the blended amount of the thermal stabilizer (D) is 0.01 to 3 parts by mass, as compared with a case where the blended amount of the thermal stabilizer (D) is less than 0.01 part by mass, thermal decomposition of the polyacetal resin is more effectively suppressed, and thus generation of formaldehyde is more effectively suppressed. In addition, as compared with a case where the blended amount of the thermal stabilizer (D) is more than 3 parts by mass, mechanical property of the polyacetal resin composition can be further improved.

(E) Mold-Releasing Agent

The mold-releasing agent is not particularly limited, but polyethylene, silicone oil, fatty acid, fatty acid ester, or a fatty acid metal salt is preferably used as the mold-releasing agent. One kind of these may be blended alone or two or more kinds thereof may be blended in combination. In this case, contamination of the mold at the time of molding process is more effectively suppressed.

Examples of polyethylene include a polyethylene wax such as low-molecular-weight polyethylene or a low-molecular-weight polyethylene copolymer and a modified polyethylene wax obtained by oxidation modifying or acid modifying these polyethylene waxes so as to introduce a polar group. The number average molecular weight of polyethylene is preferably 500 to 15000 and more preferably 1000 to 10000.

The polyethylene wax such as low-molecular-weight polyethylene or a low-molecular-weight polyethylene copolymer can be produced by a method of directly polymerizing ethylene or ethylene and α-olefin with a Ziegler catalyst or the like, a method of obtaining a polyethylene wax as a by-product obtained when high-molecular-weight polyethylene or a copolymer thereof is produced, a method of thermally decomposing high-molecular-weight polyethylene or a copolymer thereof, or the like. As such a polyethylene wax, a copolymer type polyethylene wax obtained from 50 to 99 mol % of ethylene and 1 to 50 mol % of α-olefin is preferable, and a particularly preferable polyethylene wax is polyethylene wax in which α-olefin is propylene.

An oxidation modified polyethylene wax is obtained by treating a polyethylene wax with peroxide or oxygen so as to introduce a polar group such as a carboxyl group or a hydroxyl group. An acid modified polyethylene wax is obtained by treating a polyethylene wax with an inorganic acid, an organic acid, or unsaturated carboxylic acid, as necessary, in the presence of peroxide or oxygen so as to introduce a polar group such as a carboxyl group or a sulfonic acid group. These polyethylene waxes are marketed under the names of a general type high-density polyethylene wax, a general type low-density polyethylene wax, a low acid number polyethylene wax, a high acid number polyethylene wax, an acid modified polyethylene wax, or a special monomer modified product and can be easily acquired from the market.

Examples of silicone oil include silicone oil composed of polydimethylsiloxane, silicone oil in which some of methyl groups of polydimethylsiloxane are substituted with a phenyl group, silicone oil in which some of methyl groups of polydimethylsiloxane are substituted with hydrogen or an alkyl group having 2 or more carbon atoms, silicone oil in which some of methyl groups of polydimethylsiloxane are substituted with a halogenated phenyl group, silicone oil in which some of methyl groups of polydimethylsiloxane are substituted with a fluoroester group, epoxy-modified silicone oil such as polydimethylsiloxane having an epoxy group, amino-modified silicone oil such as polydimethylsiloxane having an amino group, alkyl aralkyl silicone oil such as dimethylsiloxane or phenylmethylsiloxane, polyether-modified silicone oil such as polydimethylsiloxane having a structure in which some of methyl groups of the dimethylsiloxane unit are substituted with polyether, and alkyl aralkyl polyether-modified silicone oil such as a polymer of phenylmethylsiloxane and dimethylsiloxane in which some of methyl groups of the dimethylsiloxane unit are substituted with polyether.

Examples of fatty acid include saturated or unsaturated fatty acid having 12 or more carbon atoms. Examples of the fatty acid include lauric acid, tridecyl acid, myristic acid, pentadecyl acid, palmitic acid, heptadecyl acid, stearic acid, nonadecane acid, arachic acid, behenic acid, lignoceric acid, cerotic acid, heptacosanoic acid, montanic acid, melissic acid, lacceric acid, oleic acid, elaidic acid, linoleic acid, linolenic acid, arachidonic acid, cetolic acid, and erucic acid. The fatty acid is preferably saturated fatty acid having 12 to 22 carbon atoms.

Examples of fatty acid ester include fatty acid ester of fatty acid having 5 to 32 carbon atoms and monohydric or polyhydric alcohol having 2 to 30 carbon atoms. Examples of fatty acid include saturated fatty acid such as caproic acid, caprylic acid, undecylic acid, lauryl acid, tridecyl acid, myristic acid, palmitic acid, stearic acid, behenic acid, lignoceric acid, cerotic acid, montanic acid, or melissic acid; or unsaturated fatty acid such as oleic acid, elaidic acid, linoleic acid, linolenic acid, arachidonic acid, brassidic acid, erucic acid, or ricinoleic acid. Examples of alcohol include monohydric alcohol such as propyl alcohol, isopropyl alcohol, butyl alcohol, octyl alcohol, capryl alcohol, lauryl alcohol, myristyl alcohol, stearyl alcohol, or behenyl alcohol; or polyhydric alcohol such as ethylene glycol, propylene glycol, butanediol, glycerin, pentaerythritol, or sorbitan. The fatty acid ester is preferably fatty acid ester of fatty acid having 12 to 22 carbon atoms and monohydric or polyhydric alcohol having 2 to 22 carbon atoms.

A fatty acid metal salt is a salt of higher fatty acid and metal. The higher fatty acid indicates fatty acid having 12 or more carbon atoms. Examples of the higher fatty acid include stearic acid, oleic acid, octanoic acid, lauryl acid, behenic acid, and ricinoleic acid. Examples of metal include zinc, calcium, magnesium, nickel, and copper.

The blended amount of the mold-releasing agent (E) is preferably 0.01 to 3 parts by mass, more preferably 0.05 to 2.5 parts by mass, and even more preferably 0.05 to 2 parts by mass with respect to 100 parts by mass of the polyacetal resin. When the blended amount of the mold-releasing agent (E) is 0.01 to 3 parts by mass with respect to 100 parts by mass of the polyacetal resin, as compared with a case where the blended amount of the mold-releasing agent (E) is less than 0.01 part by mass, contamination of the mold at the time of molding process is more effectively suppressed. In addition, as compared with a case where the blended amount of the mold-releasing agent (E) is more than 3 parts by mass, mechanical property of the polyacetal resin composition can be further improved.

(F) Weathering Stabilizer

In the polyacetal resin composition of the invention, a weathering stabilizer is preferably further blended. In this case, generation of formaldehyde can be more effectively suppressed. As the weathering stabilizer, a light stabilizer or an ultraviolet absorber is preferably used. As the light stabilizer, a hindered amine-based light stabilizer is preferably used. As the light stabilizer, in particular, a light stabilizer represented by the following General Formula (6) is preferably used.

[Chem. 8]

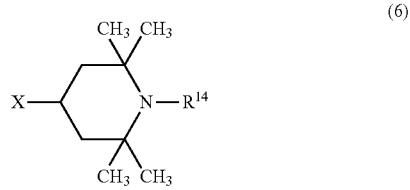

(6)

In the above formula, $R^{14}$ represents an organic group in which a bonding portion with a nitrogen atom is a carbon atom, and X represents an organic group that is bonded with the 4-position of a piperidyl group via an oxygen atom or a nitrogen atom, or a hydrogen atom.

Examples of $R^{14}$ include a linear or branched alkyl group having 1 to 10 carbon atoms. Examples of such an alkyl group include a methyl group, an ethyl group, a propyl group, a t-butyl group, a hexyl group, an octyl group, and a decyl group. Among them, a methyl group is preferable.

Specific examples of a preferable hindered amine-based light stabilizer include bis(1,2,2,6,6-pentamethyl-4-piperidinyl)sebacate, 1-[2-{3-(3,5-di-t-butyl-4-hydroxyphenyl)propionyloxy}ethyl]-4-[3-(3,5-di-t-butyl-4-hydroxyphenyl)propionyloxy]-2,2,6,6-tetramethylpiperidine, tetrakis(1,2,2,6,6-pentamethyl-4-piperidyl)-1,2,3,4-butanetetracarboxylate, 1,2,2,6,6-pentamethyl-4-piperidyl and tridecyl-1,2,3,4-butanetetracarboxylate (a mixture of compounds in which some of four ester parts of butanetetracarboxylate are 1,2,2,6,6-pentamethyl-4-piperidyl group and the others are a tridecyl group), a condensate of 1,2,3,4-butanetetracarboxylate, 1,2,2,6,6-pentamethyl-4-piperidinol, and β,β,β,β-tetramethyl-3,9(2,4,8,10-tetraoxaspiro[5,5]undecane)-diethanol, a condensate of dimethyl succinate and 4-hydroxy-2,2,6,6-tetramethyl-1-piperidineethanol, 1,2,2,6,6-pentamethyl-4-piperidyl methacrylate, N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, and bis(1,2,2,6,6-pentamethyl-4-piperidyl)[[3,5-bis(1,1dimethylethyl)-4-hydroxyphenyl]methyl]butylmalonate.

One kind of the weathering stabilizer (F) may be blended alone or two or more kinds thereof may be blended in combination. The blended amount of the weathering stabilizer (F) is preferably 0.01 to 3 parts by mass, more preferably 0.03 to 2 parts by mass, and even more preferably 0.05 to 1 part by mass with respect to 100 parts by mass of the polyacetal resin. When the blended amount of the weathering stabilizer (F) is 0.01 to 3 parts by mass, as compared with a case where the blended amount of the weathering stabilizer (F) is out of the above range, generation of formaldehyde can be more effectively suppressed.

In the polyacetal resin composition, in addition to the above-described components (A) to (F), additives such as an inorganic filler, an antioxidant, a colorant, a nucleating agent, a plasticizer, a fluorescent whitening agent, a sliding agent, an antistatic agent such as polyethylene glycol or glycerin, and a higher fatty acid salt may be further blended. Among these, in the polyacetal resin composition, an inorganic filler is preferably blended.

As the inorganic filler, any inorganic filler, which is generally blended in a thermoplastic resin, can be used. The inorganic filler may have any shapes of a fibrous shape, a plate shape, a needle shape, a spherical shape, a powder shape, and the like. Examples of the inorganic filler may include a fibrous reinforced filler such as silica fiber, silica.alumina fiber, alumina fiber, zirconia fiber, boron nitride fiber, silicon nitride fiber, carbon fiber, boron fiber, potassium titanate fiber, metal fiber such as stainless steel and the like, or aramid fiber; a powder-shaped inorganic filler such as carbon black, graphite, silica, quartz powder, glass bead, milled fiber, glass balloon, glass powder, calcium silicate, aluminum silicate, kaolin, clay, diatomaceous earth, a silicate salt like wollastonite, iron oxide, titanium oxide, zinc oxide, antimony trioxide, oxide of metal like alumina, metal carbonate like calcium carbonate, a sulfate salt like barium sulfate, ferrite, silicon carbide, silicon nitride, boron nitride, or various metal powder; and a plate-shape filler such as mica, talc, or glass flake. These may be used alone or several kinds thereof may be used concurrently.

Among these, glass fiber, carbon fiber, talc, or mica is preferably used. In particular, from the viewpoint of mechanical property and heat resistance, glass fiber is preferably used.

Further, in terms of handleability and adhesiveness with a resin component, an inorganic filler subjected to surface treatment with a surface treatment agent such as a silane coupling agent, a titanate compound or an isocyanate compound may be used, as necessary. The adhering amount of the surface treatment agent is preferably 0.01 part by mass or more and more preferably 0.05 part by mass or more with respect to 100 parts by mass of the inorganic filler.

Further, in the polyacetal resin composition of the invention, in order to provide toughness and impact resistance, thermoplastic polyurethane is preferably blended. As such thermoplastic polyurethane, in particular, thermoplastic polyurethane, which contains a remaining isocyanate amount of 0.10% by mass or less, has a moisture content of 3000 mass ppm or less, and exhibits a melt viscosity of 200,000 pores or more at 180° C., is preferably used.

Further, dicarboxylic acid represented by $R^1(COH)_2$, dicarboxylic acid halide represented by $R^1(COX)_2$ or $R^8(COX)_2$, dicarboxylic acid ester represented by $R^1(COOY)_2$ or $R^8(COOY)_2$, alternatively, $R^2$—C(=O)—$R^3$, $R^4$—C(=O)—$R^5$, $R^6$=O, or $R^7$=O, or a reaction product, which is obtainable by reacting only one end of a dihydrazide compound with $R^2$—C(=O)—$R^3$, $R^4$—C(=O)—$R^5$, $R^6$=O, or $R^7$=O, may be contained in the polyacetal resin composition.

Further, the invention is a resin molded article being obtained by molding the aforementioned polyacetal resin composition.

The molding method is not particularly limited, and examples of the molding method include an injection molding method and an extrusion molding method.

The polyacetal resin composition of the invention is capable of, for example, sufficiently suppressing generation of formaldehyde, and thus as a measure for so-called sick house syndrome, the polyacetal resin composition is useful for automobile interior parts, interior parts for houses or the like (hot water mixing plugs or the like), clothing parts (fasteners, belt buckles, or the like), building material uses (pipes, pump parts, or the like), machine components (gears or the like), and the like.

EXAMPLES

Hereinafter, the invention will be described more specifically by means of Examples and Comparative Examples. However, the invention is not limited to the following Examples.

Materials used in Examples and Comparative Examples are as follows.

(A) Polyacetal Resin (POM)

Acetal copolymer obtainable by copolymerizing trioxane and 1,3-dioxolan such that the content of 1,3-dioxolan in POM becomes 4.2% by mass, in which a melt index (ASTM-D1238 standard: 190° C., 2.16 kg) is 10.5 g/10 min.

(B) Dihydrazone Compound

B-1: 1,12-bis[2-(1-methylethylidene)hydrazino]]-1,12-dodecanedione
B-2: 1,12-bis[2-(1-methylpropylidene)hydrazino]-1,12-dodecanedione
B-3: 1,12-bis[2-(1-ethylpropylidene)hydrazino]-1,12-dodecanedione
B-4: 1,12-bis(2-cyclohexylidenehydrazino)-1,12-dodecanedione
B-5: 1,12-bis(2-ethylidenehydrazino)-1,12-dodecanedione
B-6: 1,12-bis(2-propylidenehydrazino)-1,12-dodecanedione
B-7: 1,8-bis[2-(1-methylethylidene)hydrazino]-1,8-octanedione
B-8: 1,6-bis[2-(1-methylethylidene)hydrazino]-1,6-hexanedione
B-9: 1,6-bis[2-(1-methylpropylidene)hydrazino]-1,6-hexanedione
B-10: 1,3-bis[2-(1-methylethylidene)hydrazinocarbonyl]benzene
B-11: 1,18-bis[2-(1-methylethylidene)hydrazino]-1,18-octadecanedione
B-12: 1,4-bis[2-(1-methylethylidene)hydrazino)-1,4-cyclohexanedione
B-13: 1,12-bis(2-methylidenehydrazino)-1,12-dodecanedione
B-14: 1,3-bis(2-methylidenehydrazinocarbonyl)benzene
B-15: 1,12-bis[2-(1,3-dimethylbutylidene)hydrazino]-1,12-dodecanedione
B-16: 1,12-bis[2-(diphenylmethylidene)hydrazino]-1,12-dodecanedione
B-17: 1,12-bis(2-benzylidenehydrazine)-1,12-dodecanedione
B-18: 1,12-bis(2-neopentylidenehydrazino)-1,12-dodecanedione
B-19: 1,6-bis[2-(1,3-dimethylbutylidene)hydrazino]-1,6-hexanedione
B-20: 1,4-bis[2-(1-methylethylidene)hydrazino)-1,4-butanedione
B-21: 1,22-bis[2-(1-methylethylidene)hydrazino)-1,22-docosanedione (C) Hydrazide Compound C-1: 1,12-dodecanedioic acid dihydrazide
C-2: adipic acid dihydrazide
C-3: isophthalic acid dihydrazide
C-4: stearic acid hydrazide Incidentally, B-1 described above was synthesized as follows.

A glass reaction vessel was charged with 310.0 g (1.2 mol) of dodecanedioic acid dihydrazide and 845.9 g of methanol and was heated to 50° C. Thereto, 348.5 g (6.0 mol) of acetone was added dropwise so as to perform reaction. Thereafter, the resultant mixture was cooled to precipitate crystals, and the crystals was separated by filtration, washed with water, and dried to thereby obtain 305.0 g of B-1 (weight yield: 75.1%).

In addition, B-6 was obtained in the same manner as in B-1, except that propyl aldehyde was used as a raw material instead of acetone.

B-2 to B-5 and B-7 to B-21 were obtained in the same manner as in B-1, except that acetone and dodecanedioic acid dihydrazide as raw materials were appropriately changed, respectively.

Production of Polyacetal Resin Composition

Examples 1 to 34 and Comparative Examples 1 to 11

The polyacetal resin (A), the dihydrazone compound (B), and the hydrazide compound (C) were uniformly mixed at the blending ratios presented in Tables 1 to 10 with Super Mixer manufactured by KAWATA MFG Co., Ltd., and the obtained mixture was melted and kneaded with a biaxial extruder (PCM-30 manufactured by Ikegai Corp., screw diameter: 30 mm) according to the general method under the conditions of a screw rotation number of 120 rpm and a cylinder setting temperature of 190° C., extruded into a strand, and cut with a pelletizer to thereby produce a pellet of the polyacetal resin composition. Incidentally, in Tables 1 to 10, the unit of the blended amount is part(s) by mass.

[Property Evaluation]

(1) Effect of Suppressing Generation of Formaldehyde

Regarding an effect of suppressing generation of formaldehyde, the generated amount of formaldehyde was measured and the evaluation was conducted on the basis of the generated amount of formaldehyde. The generated amount of formaldehyde was obtained as follows.

<Preparation of Plate Test Piece>

Pellets of the polyacetal resin compositions obtained in Examples 1 to 34 and Comparative Examples 1 to 11 were injection-molded by using an injection molding machine PS-40 manufactured by NISSEI PLASTIC INDUSTRIAL CO., LTD. at a cylinder temperature of 215° C. and a mold temperature of 80° C. to prepare plate test pieces of 100 mm×40 mm×2 mm.

<Measurement of Generated Amount of Formaldehyde>

On the day following the production of this plate test piece, for the plate test piece, the generated amount of formaldehyde (μg/g-POM) was measured by the following method according to the method described in German Automobile Industrial Association Standard VDA275 (Automobile Indoor Parts-Quantitative measurement of discharged amount of formaldehyde by revised flask method).

(i) First, 50 ml of distilled water was put into a polyethylene vessel, the lid thereof was closed in a state in which the plate test piece was hung in the air, and the vessel was heated in a sealed state at 60° C. for 3 hours.

(ii) Subsequently, after leaving the vessel at room temperature for 60 minutes, the plate test piece was taken out.

(iii) The amount of formaldehyde absorbed into the distilled water in the polyethylene vessel was measured by acetylacetone colorimetry using a UV spectrometer, and a value obtained by dividing the amount of formaldehyde by the mass of POM in the plate test piece was used as the generated amount of formaldehyde. The results thereof are presented in Tables 1 to 10.

Incidentally, in Tables 1 to 10, criteria of pass/fail on the effect of suppressing generation of formaldehyde were set as follows.

A case where the generated amount of formaldehyde is 2.5 μg/g-POM or less: Pass

A case where the generated amount of formaldehyde is more than 2.5 μg/g-POM: Fail (2) Effect of Suppressing Contamination of Mold The effect of suppressing contamination of the mold was evaluated as follows. First, using a Minimat M8/7A molding machine manufactured by Sumitomo Heavy Industries, Ltd. with a so-called droplet type mold, 3000-shot continuous molding was performed on the pellets of the polyacetal resin compositions obtained in Examples 1 to 34 and Comparative Examples 1 to 11 at a molding temperature of 200° C. and a mold temperature of 80° C. After the completion of molding, the state of inner wall surfaces of the mold was observed with the naked eyes. Herein, criteria on the effect of suppressing contamination of the mold were set as follows.

A: There is no matter adhering to the mold and the effect of suppressing contamination of the mold is extremely good.
B: There is a slightly small amount of matters adhering to the mold and the effect of suppressing contamination of the mold is extremely good.
C: There is a small amount of matters adhering to the mold but the effect of suppressing contamination of the mold is good.
D: There is a large amount of matters adhering to the mold and the effect of suppressing contamination of the mold is poor.

Herein, A to C were considered to pass and D was considered to fail. The results thereof are presented in Tables 1 to 10.

(3) Mechanical Property

The mechanical property was evaluated as follows. First, using an injection molding machine (product name: EC100S, manufactured by TOSHIBA MACHINE CO., LTD.), temperatures of four cylinders disposed toward the downstream side from upstream side were set to 190° C., 190° C., 180° C., and 170° C., respectively, the mold temperature was set to 90° C., and the pellets of the polyacetal resin compositions obtained in Examples 1 to 34 and Comparative Examples 1 to 11 were injection-molded to thereby prepare test pieces for tensile test specified by ISO9988-2 standard. Then, using a tensile tester (product name: STROGRAPH APII, manufactured by Toyo Seiki Seisaku-sho, Ltd.), the tensile test was performed on the test pieces for tensile test under the condition according to 150527 standard and the tensile yield strength was measured. The results thereof are presented in Tables 1 to 10. In Tables 1 to 10, criteria of pass/fail on the mechanical property were as follows.

A case where the tensile yield strength is 60 MPa or more: Pass
A case where the tensile yield strength is less than 60 MPa: Fail

TABLE 1

|  |  |  | Example 1 | Example 2 | Example 3 | Example 4 | Example 5 |
|---|---|---|---|---|---|---|---|
|  | (A) Polyacetal resin |  | 100 | 100 | 100 | 100 | 100 |
| (B) Dihydrazone compound | B-1 | 1,12-bis[2-(1-methylethylidene)hydrazino]-1,12-dodecanedione | 0.02 | 0.05 | 0.1 | 0.3 | 0.5 |
| Formaldehyde suppressing effect | Generated amount of HCHO at 215° C. (unit: μg/g-POM) |  | 1.5 | 1 | 0.7 | 0.4 | 0.4 |
|  | Mold contamination property (MD) |  | A | A | A | A | A |
| Mechanical property | Tensile yield strength (MPa) |  | 63 | 63 | 63 | 63 | 63 |

TABLE 2

|  |  |  | Example 6 | Example 7 | Example 8 | Example 9 | Example 10 |
|---|---|---|---|---|---|---|---|
|  | (A) Polyacetal resin |  | 100 | 100 | 100 | 100 | 100 |
| (B) Dihydrazone compound | B-1 | 1,12-bis[2-(1-methylethylidene)hydrazino]-1,12-dodecanedione | 1 | 3 | 5 |  |  |
|  | B-2 | 1,12-bis[2-(1-methylpropylidene)hydrazino]-1,12-dodecanedione |  |  |  | 0.3 |  |
|  | B-3 | 1,12-bis[2-(1-ethylpropylidene)hydrazino]-1,12-dodecanedione |  |  |  |  | 0.3 |
| Formaldehyde suppressing effect | Generated amount of HCHO at 215° C. (unit: μg/g-POM) |  | 0.4 | 0.4 | 0.4 | 1.8 | 2.1 |
|  | Mold contamination property (MD) |  | B | B | B | A | A |
| Mechanical property | Tensile yield strength (MPa) |  | 63 | 63 | 61 | 63 | 63 |

TABLE 3

|  |  |  | Example 11 | Example 12 | Example 13 | Example 14 | Example 15 |
|---|---|---|---|---|---|---|---|
|  | (A) Polyacetal resin |  | 100 | 100 | 100 | 100 | 100 |
| (B) | B-4 | 1,12-bis(2- | 0.3 |  |  |  |  |

TABLE 3-continued

|  |  | Example 11 | Example 12 | Example 13 | Example 14 | Example 15 |
|---|---|---|---|---|---|---|
| Dihydrazone compound |  cyclohexylidenehydrazino)-1,12-dodecanedione |  |  |  |  |  |
|  | B-5  1,12-bis(2-ethylidenehydrazino)-1,12-dodecanedione |  | 0.3 |  |  |  |
|  | B-6  1,12-bis(2-propylidenehydrazino)-1,12-dodecanedione |  |  | 0.3 |  |  |
|  | B-7  1,8-bis[2-(1-methylethylidene)hydrazino]-1,8-octanedione |  |  |  | 0.3 |  |
|  | B-8  1,6-bis[2-(1-methylethylidene)hydrazino]-1,6-hexanedione |  |  |  |  | 0.3 |
| Formaldehyde suppressing effect | Generated amount of HCHO at 215° C. (unit: μg/g-POM) | 1.3 | 0.5 | 0.5 | 0.4 | 0.6 |
|  | Mold contamination property (MD) | A | A | A | A | B |
| Mechanical property | Tensile yield strength (MPa) | 63 | 63 | 63 | 63 | 63 |

TABLE 4

|  |  |  | Example 16 | Example 17 | Example 18 | Example 19 |
|---|---|---|---|---|---|---|
| (A) | Polyacetal resin |  | 100 | 100 | 100 | 100 |
| (B) Dihydrazone compound | B-9 | 1,6-bis[2-(1-methylpropylidene)hydrazino]-1,6-hexanedione | 0.3 |  |  |  |
|  | B-10 | 1,3-bis[2-(1-methylethylidene)hydrazinocarbonyl]benzene |  | 0.3 |  |  |
|  | B-11 | 1,18-bis[2-(1-methylethylidene)hydrazino)-1,18-octadecanedione |  |  | 0.3 |  |
|  | B-12 | 1,4-bis[2-(1-methylethylidene)hydrazino)-1,4-cyclohexanedione |  |  |  | 0.3 |
| Formaldehyde suppressing effect | Generated amount of HCHO at 215° C. (unit: μg/g-POM) |  | 0.7 | 0.4 | 2.3 | 0.3 |
|  | Mold contamination property (MD) |  | B | A | A | A |
| Mechanical property | Tensile yield strength (MPa) |  | 63 | 63 | 63 | 63 |

TABLE 5

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| (A) | Polyacetal resin |  | 100 | 100 | 100 | 100 | 100 | 100 |
| (B) Dihydrazone compound | B-1 | 1,12-bis[2-(1-methylethylidene)hydrazino]-1,12-dodecanedione |  | 10 |  |  |  |  |
|  | B-15 | 1,12-bis[2-(1,3-dimethylbutylidene)hydrazino]-1,12-dodecanedione |  |  | 0.3 |  |  |  |
|  | B-16 | 1,12-bis[2-(diphenylmethylidene)hydrazino]-1,12-dodecanedione |  |  |  | 0.3 |  |  |
|  | B-17 | 1,12-bis(2-benzylidenehydrazino)-1,12-dodecanedione |  |  |  |  | 0.3 |  |
|  | B-18 | 1,12-bis(2-neopentylidenehydrazino)-1,12-dodecanedione |  |  |  |  |  | 0.3 |
| Formaldehyde suppressing effect | Generated amount of HCHO at 215° C. (unit: μg/g-POM) |  | 8.1 | 0.4 | 4 | 5 | 3.7 | 2.9 |
|  | Mold contamination property (MD) |  | A | B | A | A | A | A |
| Mechanical property | Tensile yield strength (unit: MPa) |  | 63 | 57 | 63 | 63 | 63 | 63 |

TABLE 6

|  |  |  | Comparative Example 7 | Comparative Example 8 | Comparative Example 9 | Comparative Example 10 | Comparative Example 11 |
|---|---|---|---|---|---|---|---|
|  | (A) Polyacetal resin |  | 100 | 100 | 100 | 100 | 100 |
| (B) Dihydrazone compound | B-13 | 1,12-bis(2-methylidenehydrazino)-1,12-dodecanedione |  | 0.3 |  |  |  |
|  | B-14 | 1,3-bis(2-methylidenehydrazinocarbonyl)benzene |  |  | 0.3 |  |  |
|  | B-19 | 1,6-bis[2-(1,3-dimethylbutylidene)hydrazino]-1,6-hexanedione | 0.3 |  |  |  |  |
|  | B-20 | 1,4-bis[2-(1-methylethylidene)hydrazino]-1,4-butanedione |  |  |  | 0.3 |  |
|  | B-21 | 1,22-bis[2-(1-methylethylidene)hydrazino]-1,22-docosanedione |  |  |  |  | 0.3 |
| Formaldehyde suppressing effect | Generated amount of HCHO at 215° C. (unit: μg/g-POM) |  | 3 | 2.8 | 3.5 | 0.6 | 4.7 |
|  | Mold contamination property (MD) |  | B | C | C | D | A |
| Mechanical property | Tensile yield strength (unit: MPa) |  | 63 | 63 | 63 | 63 | 63 |

TABLE 7

|  |  |  | Example 20 | Example 21 | Example 22 | Example 23 | Example 24 |
|---|---|---|---|---|---|---|---|
|  | (A) Polyacetal resin |  | 100 | 100 | 100 | 100 | 100 |
| (B) Dihydrazone compound | B-1 | 1,12-bis[2-(1-methylethylidene)hydrazino]-1,12-dodecanedione | 0.1 | 0.1 | 0.1 | 0.1 | 0.1 |
| (C) Hydrazide compound | C-1 | 1,12-dodecanedioic acid dihydrazide | 0.01 | 0.1 | 0.3 | 1 | 5 |
| Formaldehyde suppressing effect | Generated amount of HCHO at 215° C. (unit: μg/g-POM) |  | 0.5 | 0.4 | 0.3 | 0.3 | 0.2 |
|  | Mold contamination property (MD) |  | A | A | B | B | C |
| Mechanical property | Tensile yield strength (MPa) |  | 63 | 63 | 63 | 63 | 61 |

TABLE 8

|  |  |  | Example 25 | Example 26 | Example 27 |
|---|---|---|---|---|---|
| (A) Polyacetal resin |  |  | 100 | 100 | 100 |
| (B) Dihydrazone compound | B-1 | 1,12-bis[2-(1-methylethylidene)hydrazino]-1,12-dodecanedione | 0.1 | 0.1 | 0.1 |
| (C) Hydrazide compound | C-2 | adipic acid dihydrazide | 0.1 |  |  |
|  | C-3 | isophthalic acid dihydrazide |  | 0.1 |  |
|  | C-4 | stearic acid hydrazide |  |  | 0.1 |
| Formaldehyde suppressing effect | Generated amount of HCHO at 215° C. (unit: μg/g-POM) |  | 0.5 | 0.5 | 0.6 |
| Mold contamination property (MD) |  |  | A | A | A |
| Mechanical property | Tensile yield strength (MPa) |  | 63 | 63 | 63 |

TABLE 9

|  |  |  | Example 28 | Example 29 | Example 30 | Example 31 |
|---|---|---|---|---|---|---|
|  | (A) Polyacetal resin |  | 100 | 100 | 100 | 100 |
| (B) Dihydrazone compound | B-4 | 1,12-bis(2-cyclohexylidenehydrazino)-1,12-dodecanedione | 0.1 |  |  |  |
|  | B-5 | 1,12-bis(2-ethylidenehydrazino)-1,12-dodecanedione |  | 0.1 |  |  |
|  | B-8 | 1,6-bis[2-(1-methylethylidene)hydrazino]-1,6-hexanedione |  |  | 0.1 |  |
|  | B-10 | 1,3-bis[2-(1-methylethylidene)hydrazinocarbonyl]benzene |  |  |  | 0.1 |

TABLE 9-continued

| | | | Example 28 | Example 29 | Example 30 | Example 31 |
|---|---|---|---|---|---|---|
| (C) Hydrazide compound | C-1 | 1,12-dodecanedioic acid dihydrazide | 0.1 | 0.1 | 0.1 | 0.1 |
| Formaldehyde suppressing effect | | Generated amount of HCHO at 215° C. (unit: μg/g-POM) | 1.4 | 0.6 | 0.6 | 0.5 |
| | | Mold contamination property (MD) | A | A | A | A |
| Mechanical property | | Tensile yield strength (MPa) | 63 | 63 | 63 | 63 |

TABLE 10

| | | | Example 32 | Example 33 | Example 34 |
|---|---|---|---|---|---|
| (A) Polyacetal resin | | | 100 | 100 | 100 |
| (B) Dihydrazone compound | B-8 | 1,6-bis[2-(1-methylethylidene)hydrazino]-1,6-hexanedione | 0.1 | 0.1 | 0.1 |
| (C) Hydrazide compound | C-2 | adipic acid dihydrazide | 0.01 | 0.5 | 1 |
| Formaldehyde suppressing effect | | Generated amount of HCHO at 215° C. (unit: μg/g-POM) | 0.6 | 0.4 | 0.3 |
| Mold contamination property (MD) | | | A | B | B |
| Mechanical property | Tensile yield strength (MPa) | | 63 | 63 | 63 |

As presented in Tables 1 to 10, it was found that all of Examples 1 to 34 satisfied acceptance criteria in terms of formaldehyde generation suppression, mold contamination suppression, and mechanical property. In contrast, it was found that Comparative Examples 1 to 11 did not satisfy acceptance criteria in terms of formaldehyde generation suppression, mold contamination suppression, or mechanical property.

Therefore, according to the polyacetal resin composition of the invention, it was confirmed that generation of formaldehyde can be sufficiently suppressed, contamination of the mold at the time of molding process can be sufficiently suppressed, and excellent mechanical property can be provided to a molded article.

The invention claimed is:

1. A polyacetal resin composition in which at least one dihydrazone compound (B) selected from the group selected from a dihydrazone compound (B1) represented by the following General Formula (1) and a dihydrazone compound (B2) represented by the following General Formula (2) is blended in 0.02 to 5 parts by mass with respect to 100 parts by mass of a polyacetal resin (A)

[Chem. 1]

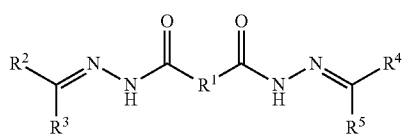

(1)

in the above formula, $R^1$ represents an aliphatic hydrocarbon group having 4 to 19 carbon atoms, an alicyclic hydrocarbon group having 6 to 10 carbon atoms, or an aromatic hydrocarbon group having 6 to 10 carbon atoms; $R^2$ to $R^5$ each represent an alkyl group having 1 or 2 carbon atoms

[Chem. 2]

$$R^6 \overset{N}{=} \underset{H}{N} \overset{O}{\underset{}{C}} R^8 \overset{O}{\underset{}{C}} \underset{H}{N} \overset{N}{=} R^7$$

(2)

in the above formula, $R^8$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms; and $R^6$ and $R^7$ each independently represent an alicyclic hydrocarbon group having 3 to 12 carbon atoms.

2. The polyacetal resin composition according to claim 1, wherein, in the above General Formula (1), $R^1$ is an aliphatic hydrocarbon group having 6 to 12 carbon atoms.

3. The polyacetal resin composition according to claim 1, wherein the dihydrazone compound (B) consists of the dihydrazone compound (B1) represented by the above General Formula (1).

4. The polyacetal resin composition according to claim 1, wherein the dihydrazone compound (B) consists of the dihydrazone compound (B2) represented by the above General Formula (2).

5. The polyacetal resin composition according to claim 1, wherein, in the above General Formula (1), $R^2$ to $R^5$ are each a methyl group.

6. The polyacetal resin composition according to claim 1, wherein the dihydrazone compound (B) is blended in 0.05 to 3 parts by mass with respect to 100 parts by mass of the polyacetal resin (A).

7. The polyacetal resin composition according to claim 1, wherein a hydrazide compound (C) is further blended at a ratio of 0.01 to 1 part by mass with respect to 100 parts by mass of the polyacetal resin (A).

8. The polyacetal resin composition according to claim 7, wherein the hydrazide compound (C) is composed of at least one kind of the group consisting of a monohydrazide compound and a dihydrazide compound.

9. The polyacetal resin composition according to claim 8, wherein the hydrazide compound (C) is composed of a dihydrazide compound.

10. A resin molded article being obtained by molding the polyacetal resin composition according to claim 1.

11. A polyacetal resin composition in which at least one dihydrazone compound (B) selected from the group selected from a dihydrazone compound (B1) represented by the following General Formula (1) and a dihydrazone compound (B2) represented by the following General Formula (2) is blended in 0.02 to 5 parts by mass with respect to 100 parts by mass of a polyacetal resin (A)

[Chem. 1]

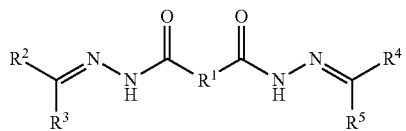

(1)

in the above formula, $R^1$ represents an alkylene group having 11 to 19 carbon atoms, or an alicyclic hydrocarbon group having 7 to 10 carbon atoms; $R^2$ to $R^5$ each independently represent a hydrogen atom or an alkyl group having 1 or 2 carbon atoms; at least one of $R^2$ and $R^3$ represents an alkyl group having 1 or 2 carbon atoms; and at least one of $R^4$ and $R^5$ represents an alkyl group having 1 or 2 carbon atoms

[Chem. 2]

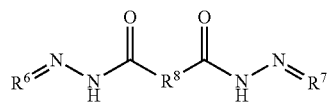

(2)

in the above formula, $R^8$ represents an aliphatic hydrocarbon group having 4 to 20 carbon atoms, an alicyclic hydrocarbon group having 6 to 10 carbon atoms, or an aromatic hydrocarbon group having 6 to 10 carbon atoms; and $R^6$ and $R^7$ each independently represent an alicyclic hydrocarbon group having 3 to 12 carbon atoms.

12. The polyacetal resin composition according to claim 11, wherein, in the above General Formula (1), $R^1$ is an alkylene group having 11 to 12 carbon atoms.

13. The polyacetal resin composition according to claim 11, wherein the dihydrazone compound (B) consists of the dihydrazone compound (B1) represented by the above General Formula (1).

14. The polyacetal resin composition according to claim 11, wherein the dihydrazone compound (B) consists of the dihydrazone compound (B2) represented by the above General Formula (2).

15. The polyacetal resin composition according to claim 11, wherein, in the above General Formula (1), when $R^2$ and $R^4$ are an ethyl group, $R^3$ and $R^5$ are a hydrogen atom, or when $R^2$ and $R^4$ are a methyl group, $R^3$ and $R^5$ are a hydrogen atom or a methyl group.

16. The polyacetal resin composition according to claim 11, wherein the dihydrazone compound (B) is blended in 0.05 to 3 parts by mass with respect to 100 parts by mass of the polyacetal resin (A).

17. The polyacetal resin composition according to claim 11, wherein a hydrazide compound (C) is further blended at a ratio of 0.01 to 1 part by mass with respect to 100 parts by mass of the polyacetal resin (A).

18. The polyacetal resin composition according to claim 17, wherein the hydrazide compound (C) is composed of at least one kind of the group consisting of a monohydrazide compound and a dihydrazide compound.

19. The polyacetal resin composition according to claim 18, wherein the hydrazide compound (C) is composed of a dihydrazide compound.

20. A resin molded article being obtained by molding the polyacetal resin composition according to claim 11.

* * * * *